US010011502B2

(12) United States Patent
Zebuhr

(10) Patent No.: US 10,011,502 B2
(45) Date of Patent: Jul. 3, 2018

(54) AMMONIA REMOVAL DEVICE

(71) Applicant: Aquaback Technologies, Inc., Salem, NH (US)

(72) Inventor: William H. Zebuhr, Nashua, NH (US)

(73) Assignee: Aquaback Technologies, Inc., Salem, NH (US)

( * ) Notice: Subject to any disclaimer, the term of this patent is extended or adjusted under 35 U.S.C. 154(b) by 329 days.

(21) Appl. No.: 14/714,450

(22) Filed: May 18, 2015

(65) Prior Publication Data

US 2016/0002065 A1    Jan. 7, 2016

Related U.S. Application Data

(60) Provisional application No. 62/001,976, filed on May 22, 2014.

(51) Int. Cl.
*C02F 1/04* (2006.01)
*B01D 1/06* (2006.01)
(Continued)

(52) U.S. Cl.
CPC .............. *C02F 1/041* (2013.01); *B01D 1/065* (2013.01); *B01D 1/2856* (2013.01); *B01D 3/28* (2013.01); *C02F 2101/16* (2013.01)

(58) Field of Classification Search
CPC ...... C02F 1/041; C02F 2101/16; B01D 1/065; B01D 1/2856; B01D 3/28
See application file for complete search history.

(56) References Cited

U.S. PATENT DOCUMENTS 8,858,758 B2    10/2014  Zebuhr
9,186,596 B2 *  11/2015  Hay ........................ B01D 1/065
(Continued)

FOREIGN PATENT DOCUMENTS

DE      43 24 410 C1    8/1994
FR      2 939 051       6/2010
(Continued)

OTHER PUBLICATIONS

Notification of Transmittal of the International Search Report and the Written Opinion of the International Searching Authority for Application No. PCT/US2015/031330; dated Dec. 16, 2015; Entitled: "Ammonia Removal Device".

(Continued)

*Primary Examiner* — Jonathan Miller
(74) *Attorney, Agent, or Firm* — Hamilton, Brook, Smith & Reynolds, P.C.

(57) ABSTRACT

An ammonia removal system can remove ammonia from liquid, and can include an ammonia removal portion having liquid flow surfaces for flowing the liquid downward with gravity, and for receiving vapor moving upwardly past and over the downward flowing liquid for absorbing and removing ammonia from the liquid. An evaporator can be positioned below the ammonia removal portion for receiving the downward flowing liquid now with reduced ammonia from the ammonia removal portion. One portion of the liquid with reduced ammonia can evaporate and produce the vapor for moving upwardly into the ammonia removal portion for removing the ammonia. Another portion of the liquid with reduced ammonia can be drained for removal or use. A compressor can be in communication with the ammonia removal portion for compressing the vapor after exiting the ammonia removal portion. A condenser can be in communication with the compressor for receiving compressed vapor from the compressor for condensing into liquid condensate. A recirculating conduit can connect the condenser to the ammonia removal portion for recirculating at least a portion of the liquid condensate to the ammonia removal portion for reprocessing and flowing again over the liquid flow surfaces.

14 Claims, 9 Drawing Sheets

(51) Int. Cl.
  *B01D 1/28* (2006.01)
  *B01D 3/28* (2006.01)
  *C02F 101/16* (2006.01)

(56) References Cited

U.S. PATENT DOCUMENTS

| | | |
|---|---|---|
| 2011/0313207 A1 | 12/2011 | Kaibel et al. |
| 2012/0037488 A1 | 2/2012 | Zebuhr |
| 2012/0175240 A1* | 7/2012 | Hay ................. B01D 1/065 |
| | | 203/31 |
| 2015/0075967 A1 | 3/2015 | Zebuhr |

FOREIGN PATENT DOCUMENTS

| | | |
|---|---|---|
| JP | 60114389 | 6/1985 |
| WO | WO 2015/179272 A2 | 11/2015 |

OTHER PUBLICATIONS

Invitation to Pay Additional Fees with a Partial International Search Report for Application No. PCT/US2015/031330; dated Sep. 15, 2015; Entitled: "Ammonia Removal Device".

Notification Concerning Transmittal of Copy of International Preliminary Report on Patentability, Int'l. Application No. PCT/US2015/031330, entitled "Ammonia Removal Device", filed May 18, 2015, dated Dec. 1, 2016.

International Preliminary Report on Patentability, Intl. Application No. PCT/US2015/031330, entitled "Ammonia Removal Device", filed May 18, 2015, dated Nov. 22, 2016.

\* cited by examiner

AMMONIA REMOVAL DEVICE

RELATED APPLICATION(S)

This application claims the benefit of U.S. Provisional Application No. 62/001,976, filed on May 22, 2014. The entire teachings of the above application are incorporated herein by reference.

BACKGROUND OF THE INVENTION

Wastewater can be purified with a vapor compression distiller device. However when distilling wastewater containing ammonia, for example at 80 parts per million (ppm), the distilled water can still contain about 75 ppm ammonia. The ammonia is difficult to remove because ammonia can enter the condenser of the vapor compression distiller device in gas form and dissolve into the condensing water.

SUMMARY OF THE INVENTION

The present invention can provide an ammonia removal system for or within a distiller device, such as a vapor compression distiller device, which can remove most of the ammonia from the distilled liquid condensate or water. The ammonia removal system can remove ammonia from liquid, and can include an ammonia removal portion having liquid flow surfaces for flowing the liquid over the liquid flow surfaces downward with gravity, and for receiving vapor moving upwardly past and over the downward flowing liquid for absorbing and removing ammonia from the liquid. An evaporator can be positioned below the ammonia removal portion for receiving the downward flowing liquid now with reduced ammonia from the ammonia removal portion. One portion of the liquid with reduced ammonia can evaporate and produce the vapor for moving upwardly into the ammonia removal portion for removing the ammonia. Another portion of the liquid with reduced ammonia can be drained for removal or use. A compressor can be in communication with the ammonia removal portion for compressing the vapor after exiting the ammonia removal portion. A condenser can be in communication with the compressor for receiving compressed vapor from the compressor for condensing into liquid condensate. A recirculating conduit can connect the condenser to the ammonia removal portion for recirculating at least a portion of the liquid condensate to the ammonia removal portion for reprocessing and flowing again over the liquid flow surfaces.

In particular embodiments, the system can include an outlet from the condenser for removing ammonia. The liquid flow surfaces of the ammonia removal portion can include a series of thin spaced apart upright surfaces for receiving downward flow of liquid over the spaced apart upright surfaces in a thin film while the vapor moves upwardly past and over the thin film in gaps therebetween. The evaporator and the condenser can be part of an evaporator/condenser having upright evaporator surfaces and channels, and upright condenser surfaces and channels, with common channel walls therebetween. The liquid flow surfaces can include a spirally wound upright thin sheet of material. The series of thin spaced apart upright surfaces of the ammonia removal portion can be configured for providing a thin film of flowing liquid about 1 to 1.25 mils thick. The liquid can include distillate water containing ammonia received from a wastewater distiller. The liquid can be delivered to the ammonia removal portion by nozzles positioned above the liquid flow surfaces. The liquid flow surfaces of the ammonia removal portion can include spaced apart generally curved thin sheets of material of decreasing radius which can be positioned about a central axis above the evaporator/condenser having the common channel walls which includes spaced apart generally curved thin sheets of material, of decreasing radius also positioned about the central axis. The liquid flow surfaces of the ammonia removal portion are configured for providing a series of spaced apart generally curved thin films of downward flowing liquid of decreasing radius, with the vapor moving in the opposite direction in gaps therebetween. The liquid flow surfaces of the ammonia removal portion can be configured for providing the series of spaced apart generally curved thin films of the downward flowing liquid which extend in a spiral configuration. The evaporator and condenser can be positioned within the interior of a vapor compression distiller contained in a housing.

The present invention can also provide a vapor compression distiller for distilling liquid, including a generally cylindrical housing. A generally annular first evaporator/condenser can be positioned within the housing and can have a first evaporator with first evaporator surfaces for evaporating the liquid into a first vapor, and a first condenser with first condenser surfaces for condensing the first vapor into first liquid condensate. A first compressor can compress the first vapor produced by the first evaporator surfaces of the first evaporator/condenser for delivery to the first condenser surfaces of the first evaporator/condenser. An ammonia removal system can be positioned within the housing, at least a portion of which can be surrounded by the generally annular first evaporator/condenser. The ammonia removal system can include an ammonia removal portion having liquid flow surfaces for flowing the first liquid condensate over the liquid flow surfaces downward with gravity, and for receiving a second vapor moving upwardly past and over the downward flowing first liquid condensate for absorbing and removing ammonia therefrom. A second evaporator/condenser can have a second evaporator with second evaporator surfaces positioned below the ammonia removal portion for receiving the downward flowing first liquid condensate now with reduced ammonia from the ammonia removal portion. One portion of the first liquid condensate with reduced ammonia can evaporate and produce the second vapor for moving upwardly into the ammonia removal portion for removing the ammonia. Another portion of the first liquid condensate with reduced ammonia can be drained for removal or use. The second evaporator/condenser also has a second condenser with second condenser surfaces. A second compressor can be in communication with the ammonia removal portion and the second condenser for compressing the second vapor after exiting the ammonia removal portion. The second condenser can receive compressed second vapor from the second compressor for condensing into a second liquid condensate. A recirculating conduit can connect the second condenser to the ammonia removal portion for recirculating at least a portion of the second liquid condensate back to the ammonia removal portion for reprocessing together with the first liquid condensate for flowing again over the liquid flow surfaces.

The present invention can also provide a method of removing ammonia from liquid, including flowing the liquid downwardly over liquid flow surfaces of an ammonia removal portion with gravity. Vapor can be moved upwardly past and over the downwardly flowing liquid for absorbing and removing ammonia from the liquid. The downwardly flowing liquid now with reduced ammonia can be received from the ammonia removal portion with an evaporator positioned below the ammonia removal portion. One portion of the liquid with reduced ammonia received can evaporate and produce a vapor for moving upwardly into the ammonia removal portion for removing the ammonia. Another portion of the liquid with reduced ammonia can be drained for removal or use. The vapor can be compressed after exiting the ammonia removal portion with a compressor in communication with the ammonia removal portion. Compressed vapor can be delivered from the compressor to a condenser in communication with the compressor for condensing the compressed vapor into liquid condensate. At least a portion of the liquid condensate can be recirculated back to the ammonia removal portion with a recirculating conduit connecting the condenser to the ammonia removal portion for reprocessing together with the liquid for flowing again over the liquid flow surfaces.

In particular embodiments, ammonia can be removed through an outlet from the condenser. The liquid flow surfaces of the ammonia removal portion can be provided with a series of thin spaced apart upright surfaces for downward flow of the liquid over the spaced apart upright surfaces in a thin film while the vapor moves upwardly past and over the thin film in gaps therebetween. The evaporator and condenser can be provided as part of an evaporator/condenser having upright evaporator surfaces and channels, and upright condenser surfaces and channels, with common channel walls therebetween. The liquid flow surfaces can be provided as a spirally wound upright thin sheet of material. The series of thin spaced apart upright surfaces can be configured to provide a thin film or series of films of flowing liquid about 1 to 1.25 mils thick. Liquid can be provided that includes distillate water containing ammonia received from a wastewater distiller. The liquid can be delivered to the ammonia removal portion by nozzles positioned above the liquid flow surfaces. The liquid flow surfaces of the ammonia removal portion can be provided with spaced apart generally curved thin sheets of material of decreasing radius which are positioned about a central axis. The evaporator/condenser can have common channel walls which include spaced apart generally curved thin sheets of material of decreasing radius also positioned about the central axis. A series of spaced apart generally curved thin films of downwardly flowing liquid of decreasing radius can be provided or formed by the liquid flow surfaces of the ammonia removal portion, with the vapor moving in the opposite direction in gaps therebetween. A series of spaced apart generally curved thin films of downwardly flowing liquid extending in a spiral configuration can be provided or formed by the liquid flow surfaces of the ammonia removal portion. The evaporator and the condenser can be positioned within the interior of a vapor compression distiller contained in a housing.

The present invention can also provide a method of distilling a liquid, including providing a vapor compression distiller having a generally annular first evaporator/condenser positioned within a housing having a first evaporator with first evaporator surfaces, and a first condenser with first condenser services. The liquid can be evaporated into a first vapor with the first evaporator surfaces. The first vapor produced by the first evaporator surfaces can be compressed with a first compressor. The first vapor can be delivered to the first condenser surfaces of the first evaporator/condenser. The first vapor can be condensed into first liquid condensate with the first condenser surfaces. An ammonia removal system can be positioned within the housing, at least a portion of which can be surrounded by the generally annular first evaporator/condenser. The first liquid condensate can flow downwardly over the liquid flow surfaces of an ammonia removal portion with gravity. A second vapor can move upwardly past and over the downward flowing first liquid condensate for absorbing and removing ammonia from the first liquid condensate. The downwardly flowing first liquid condensate now with reduced ammonia can be received from the ammonia removal portion in a second evaporator with second evaporator surfaces of a second evaporator/condenser positioned below the ammonia removal portion. One portion of the first liquid condensate with reduced ammonia can evaporate and produce the second vapor for moving upwardly into the ammonia removal portion for removing the ammonia. Another portion of the first liquid condensate with reduced ammonia can be drained for removal or use. The second evaporator/condenser can also have a second condenser with second condenser surfaces. The second vapor can be compressed after exiting the ammonia removal portion with a second compressor in communication with the ammonia removal portion and the second condenser, and the compressed second vapor can be delivered to the second condenser for condensing into a second liquid condensate. At least a portion of the second liquid condensate can be recirculated back to the ammonia removal portion with a recirculating conduit connecting the second condenser to the ammonia removal portion for reprocessing together with the first liquid condensate for flowing again over the liquid flow surfaces.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
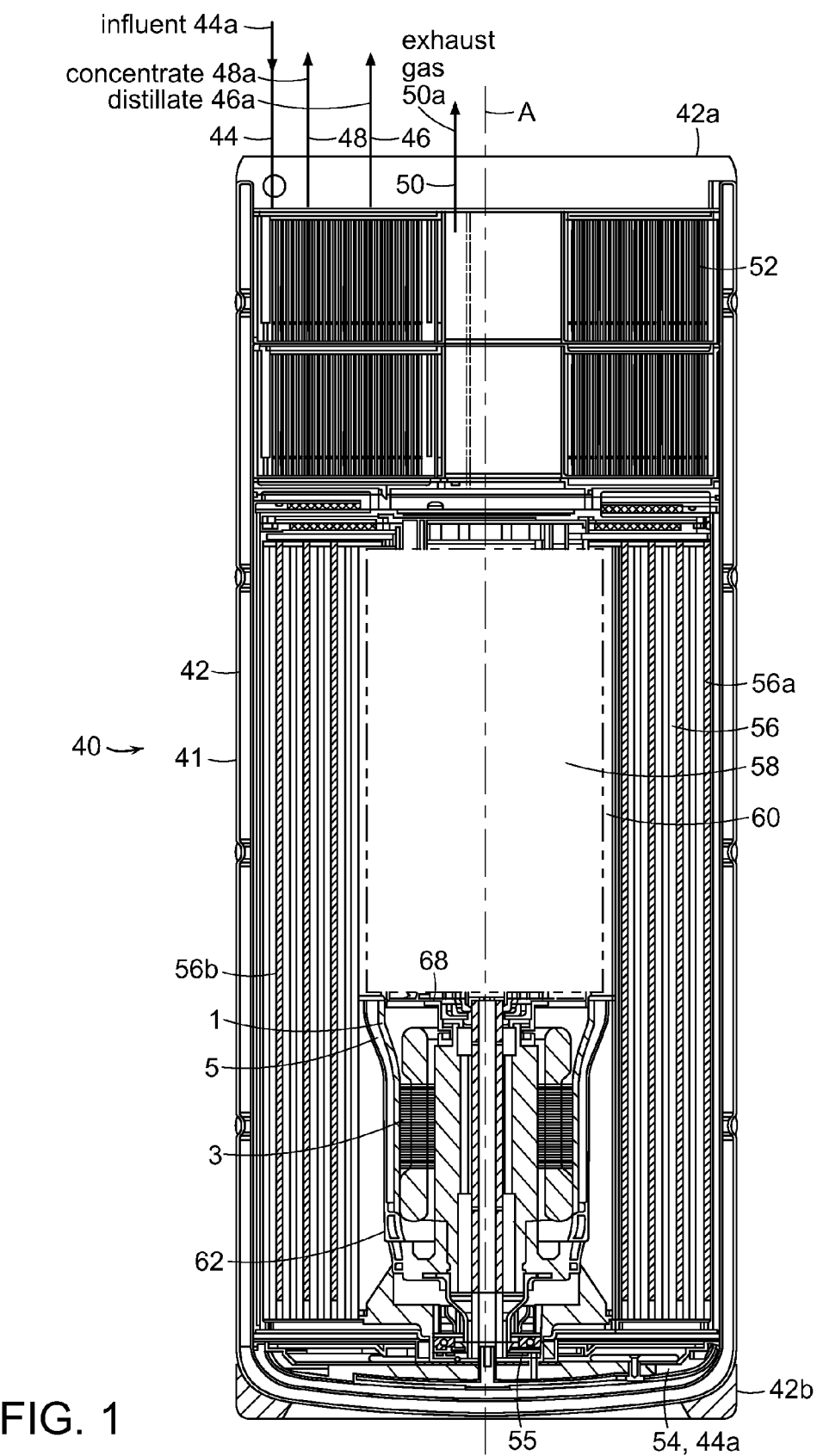
FIG. 1 is a schematic sectional drawing of one embodiment of a vapor compression distilling device containing an ammonia removal system, in the present invention.
Figure 2:
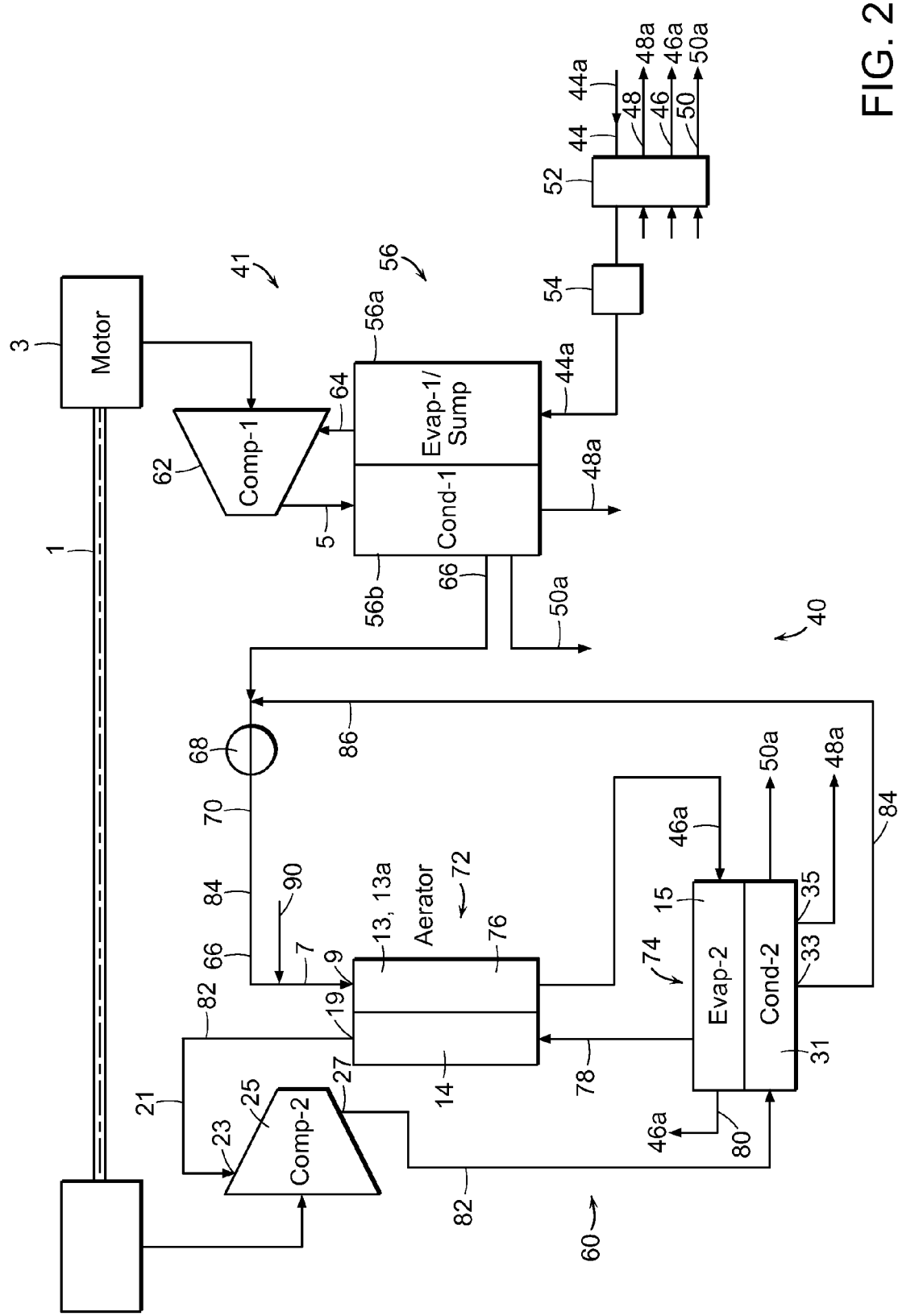
FIG. 2 is a schematic flow diagram of an embodiment of a vapor compression distilling device having an ammonia removal system.
Figure 3:
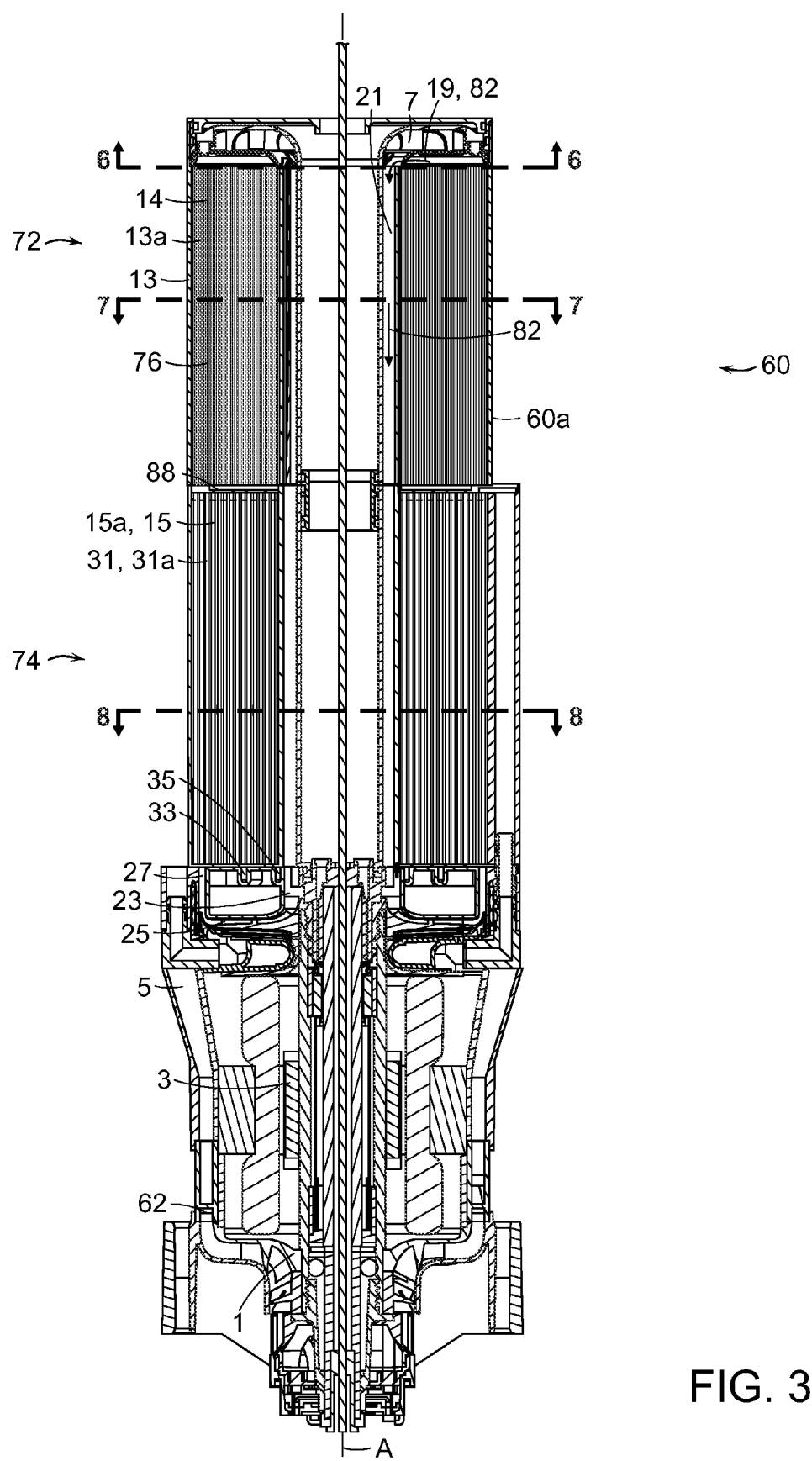
FIG. 3 is a sectional view of components including an embodiment of an ammonia removal system in the present invention.
Figure 4:
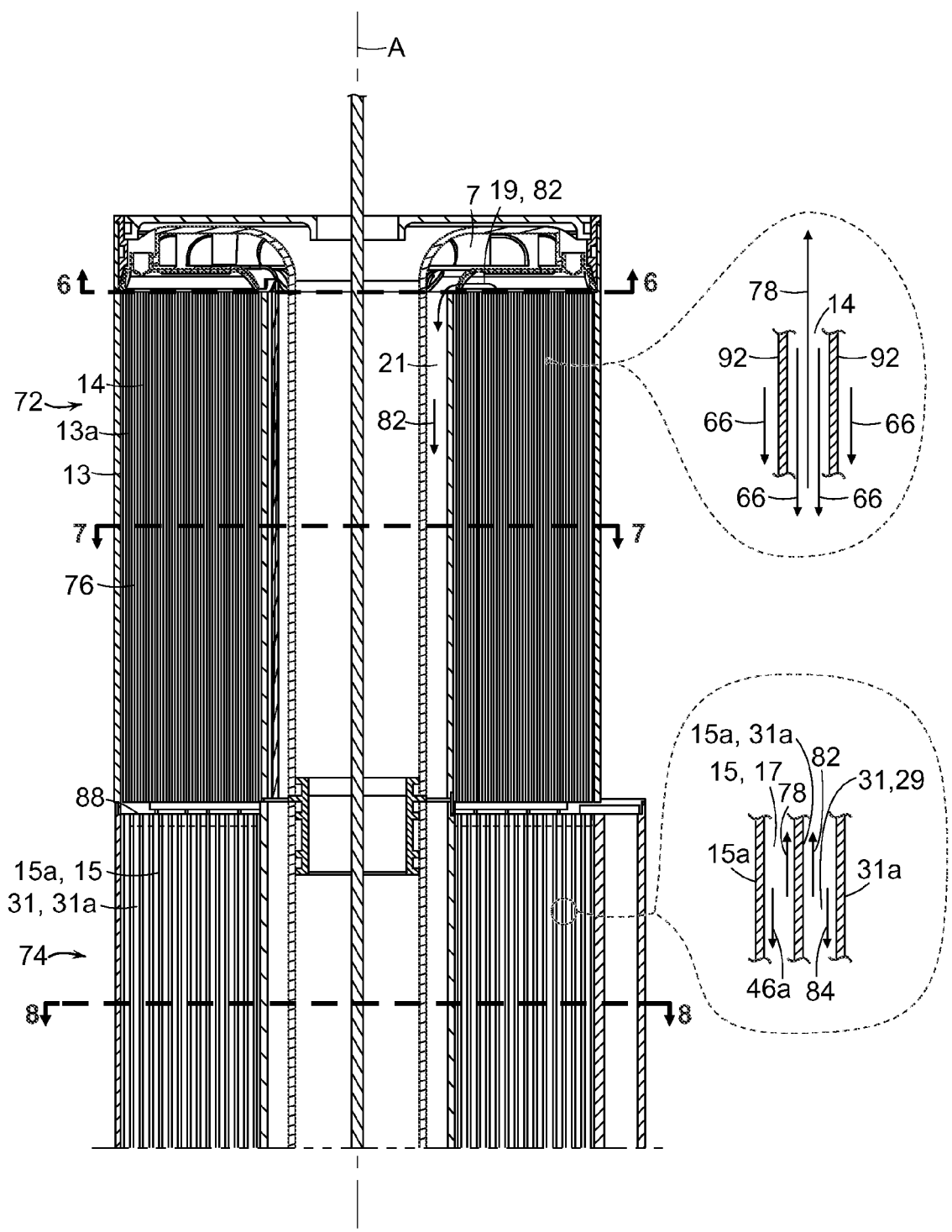
FIGS. 4 and 5 are enlarged respective top and bottom portions of FIG. 3.
Figure 5:
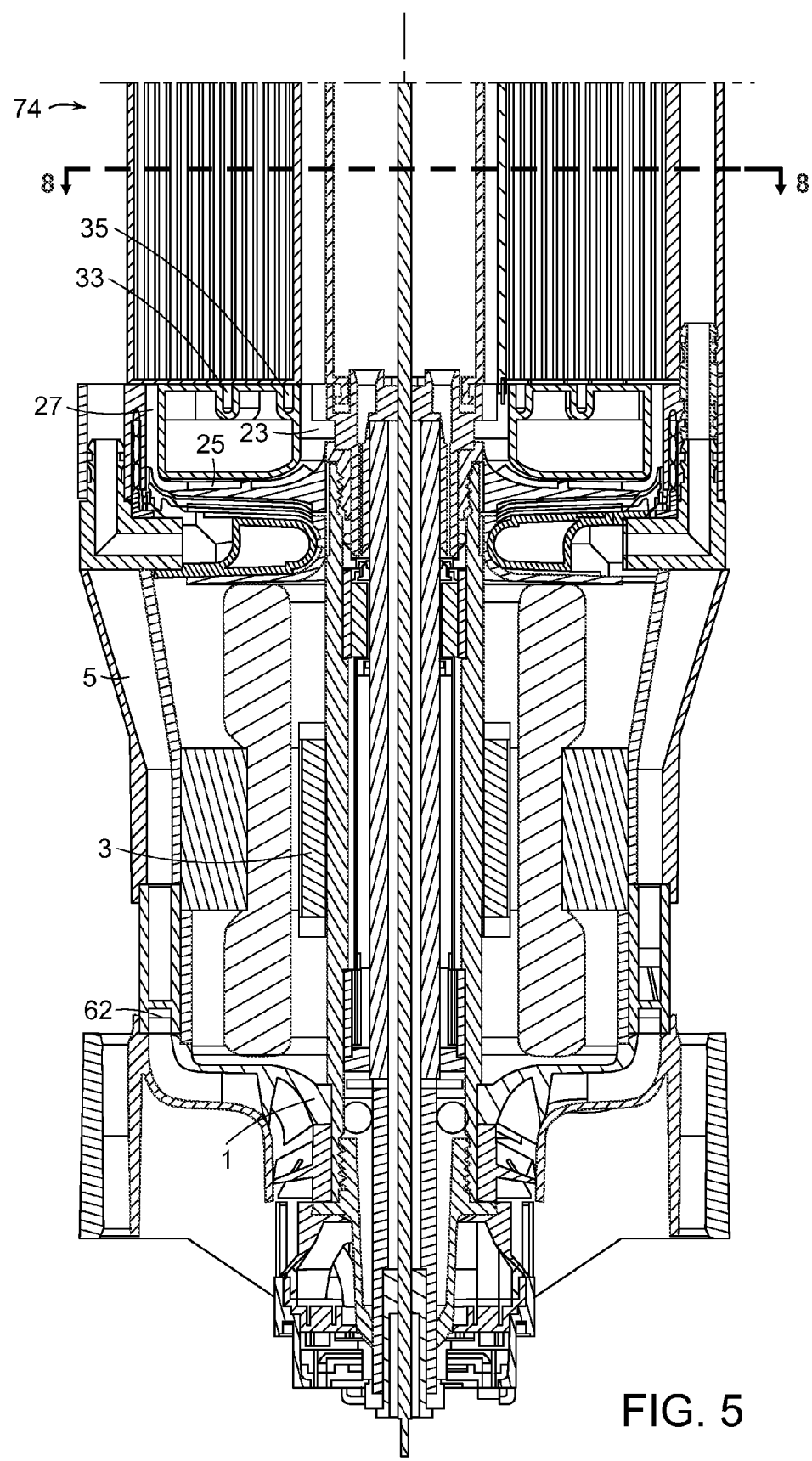
Figure 6:
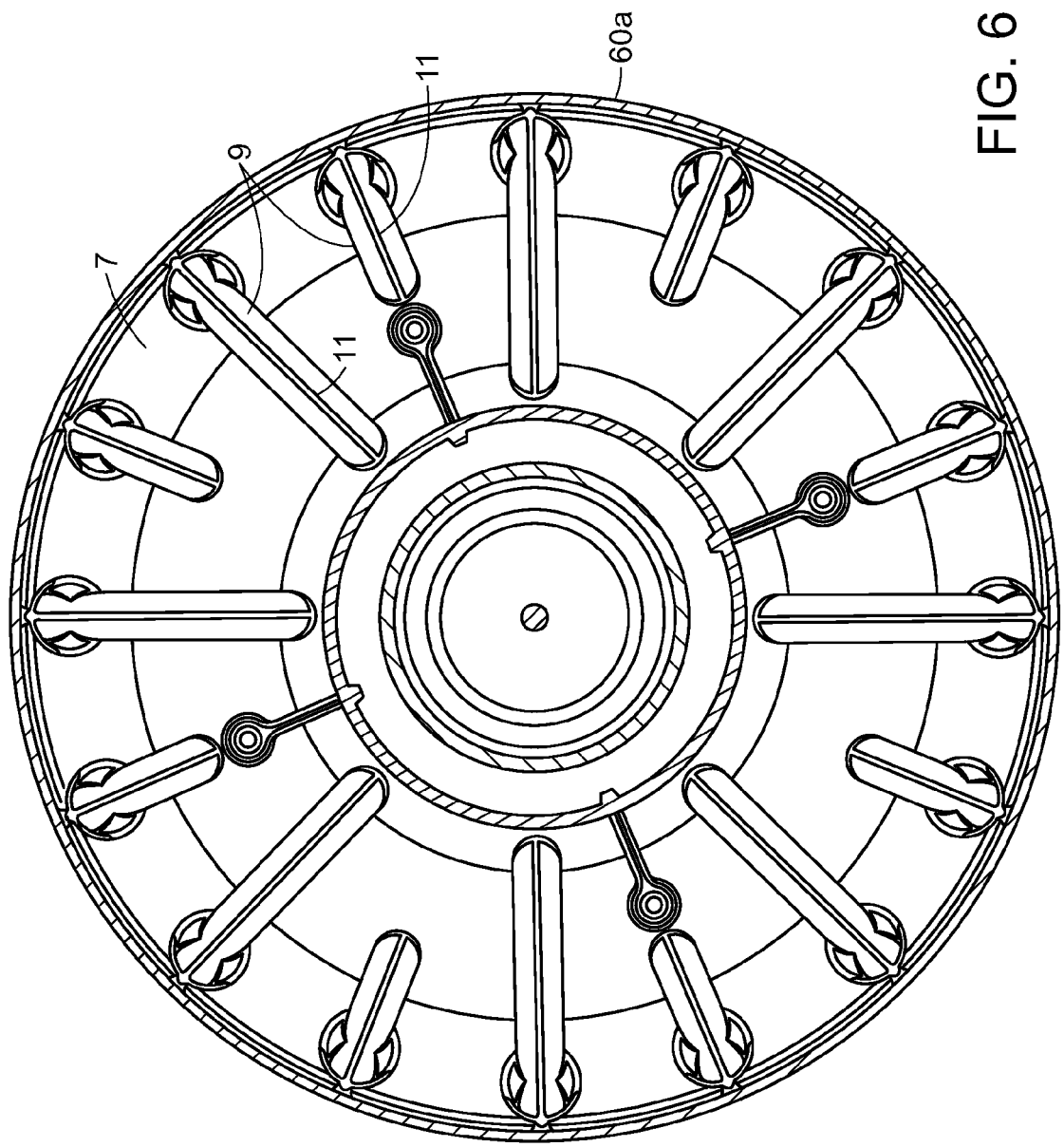
FIG. 6 is a cross-sectional view of FIG. 3 taken along lines 6-6.
Figure 7:
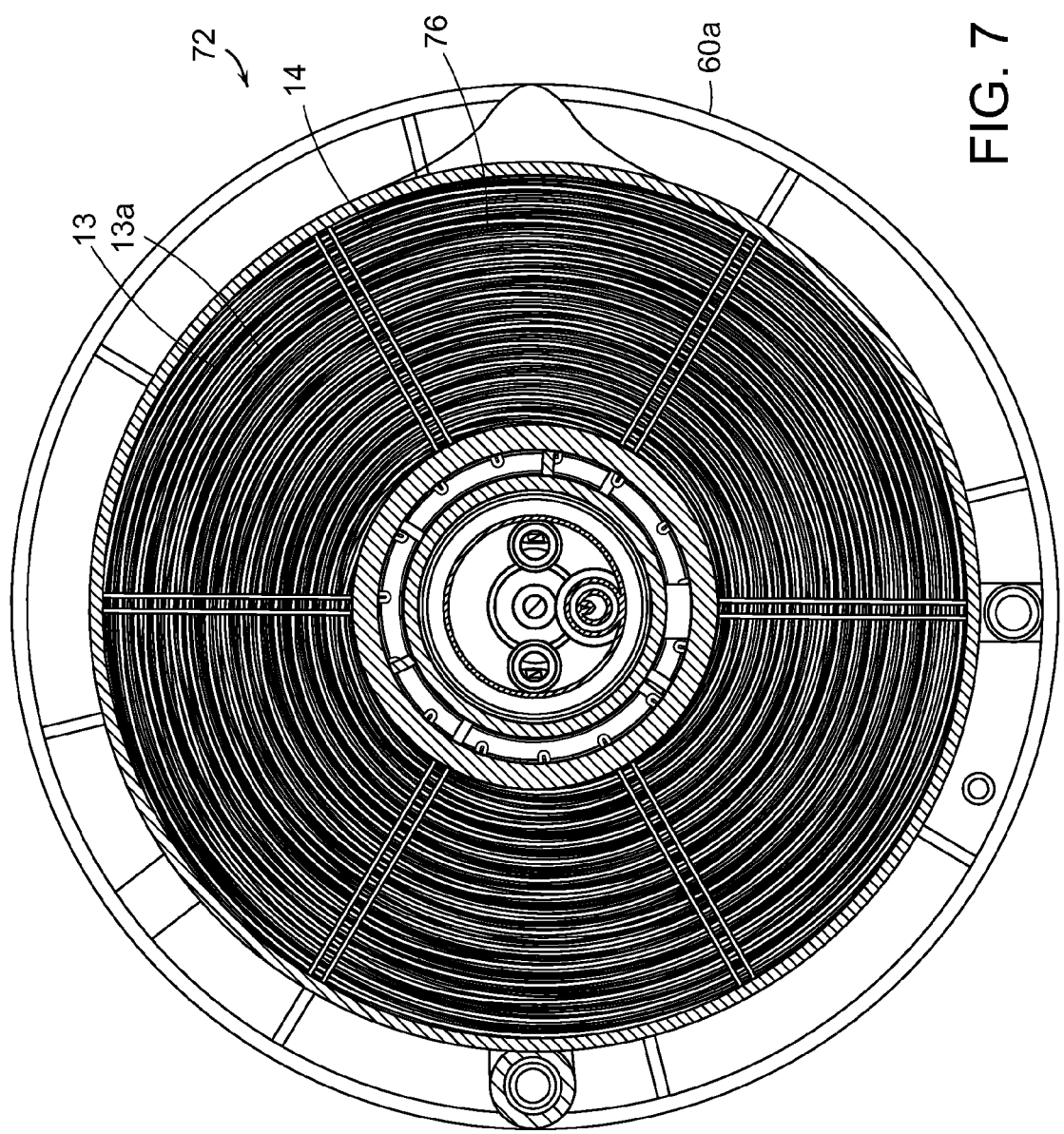
FIG. 7 is a cross-sectional view of FIG. 3 taken along lines 7-7.
Figure 7A:
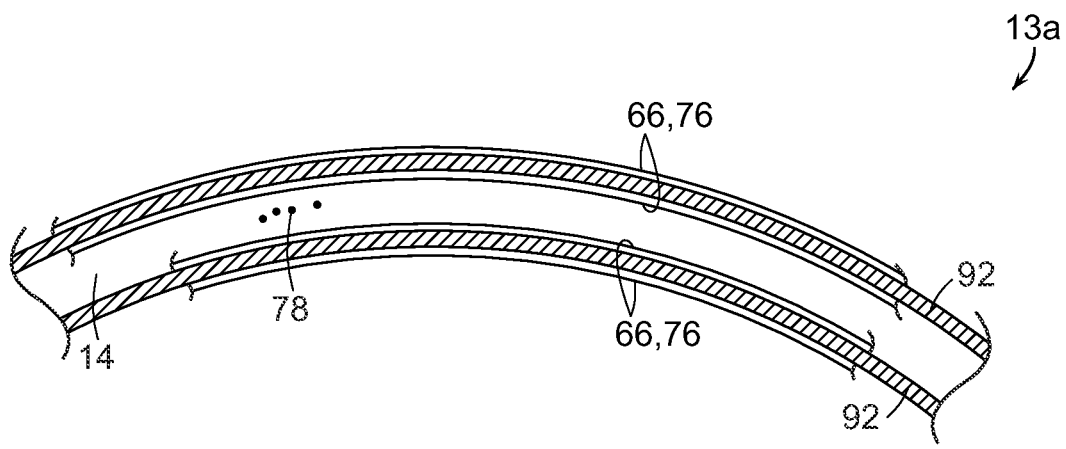
FIG. 7A is a portion thereof.
Figure 8:
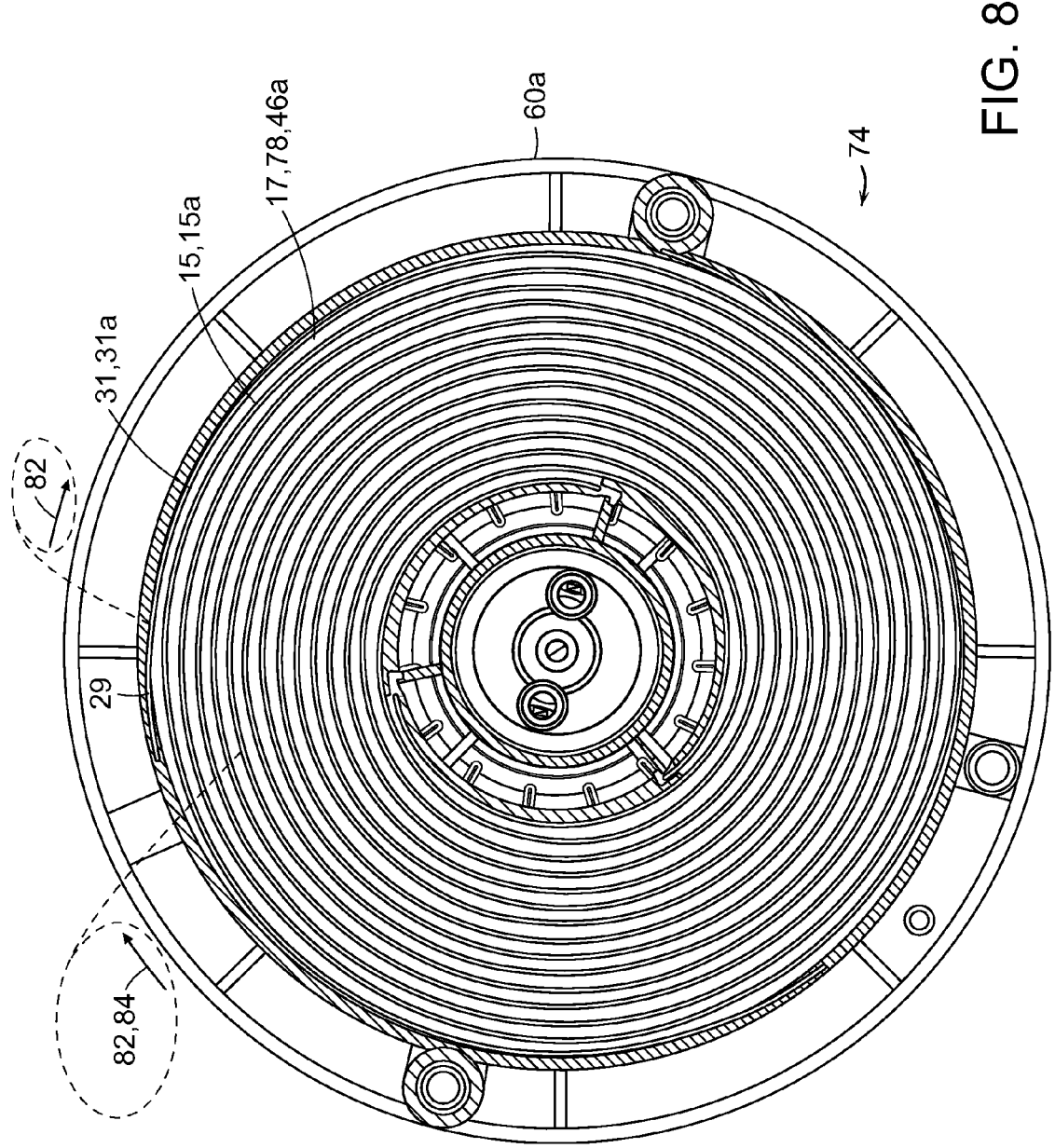
FIG. 8 is a cross-sectional view of FIG. 3 taken along lines 8-8.

Referring to FIGS. 1 and 2, distiller, distilling device, system, module or apparatus 40, can include a vapor compression distiller, distilling device, system or apparatus 41, and a ammonia removal device, system, arrangement, module or apparatus 60, positioned within an insulated housing or dewar 42. In some embodiments, the vapor compression distiller 41 can be similar to that described in U.S. Pat. No.

8,858,758, issued Oct. 14, 2014, the contents of which are incorporated herein by reference in its entirety. The vapor compression distiller 41 can distill or process influent, fluid, liquid or wastewater 44a containing ammonia in a first process step, and the ammonia removal device 60 can remove a significant amount or most of the ammonia from the distilled fluid, liquid or water in a second process step.

The dewar 42 can be generally round, circular or cylindrical in shape, extending in an elongate manner along a longitudinal central axis A, and sealed by end caps 42a and 42b. The distiller 40 can have an inlet 44 for receiving influent, liquid or wastewater 44a which can contain ammonia, for example at 80 parts per million (ppm). The influent 44a can pass through and be preheated by a counter flow heat exchanger 52 located in the upper portion of dewar 42 and flow to a sump or reservoir 54 at the bottom of the distiller 40. The counter flow heat exchanger 52 can be heated by exiting heated distillate or distilled liquid or water 46a which exits via distillate outlet 46, heated concentrate 48a which exits via concentrate outlet 48, and heated exhaust gases 50a which exit via gas vent or outlet 50. An elongate round, circular, cylindrical or annular shaped evaporator/condenser 56 can extend or be positioned between the sump 54 and the counter flow heat exchanger 52 in alignment with central axis A. The evaporator/condenser 56 can have a first evaporator 56a with spaced apart concentric round, circular or cylindrical first evaporator surfaces, for evaporating influent fluid 44a applied thereon from the sump 54 with a sump pump 55 into a first vapor, water vapor or steam 64, and a first condenser 56b with spaced apart concentric round, circular or cylindrical first condenser surfaces for condensing the first vapor 64 into a first liquid distillate or condensate 66. In some embodiments, the evaporator/condenser 56 can be formed by or include a series of upright tubes, for example about 1.25 inches in diameter, arranged adjacent to each other, and can be in an annular configuration or manner. The first evaporator 56a and the first condenser 56b can each include the aggregate of one of the opposing inner or outer surfaces of the tubes. The distiller 40 can have a rotor 1 rotatably driven about a central shaft by a motor 3 such as an electric motor, about central axis A which can be positioned within the annular cavity 58 of evaporator/condenser 56. The evaporator/condenser 56 can generally annularly surround rotor 1. The rotor 1 can include a sump pump 55, and can also include a first compressor 62 which can have a turbine for drawing or receiving the first vapor 64 from the first evaporator 56a. The first compressor 62 can be connected between the first evaporator 56a and the first condenser 56b by conduits and can compress the first vapor 64 and deliver the compressed first vapor 64 via steam passages 5 to the first condenser 56b for condensing into the first condensate 66. The first condensate 66 can still have about 75 ppm of ammonia content, so that further removal of ammonia can be performed by ammonia removal device 60. Heated concentrate 48a and exhaust gases 50a can be removed from the first evaporator/condenser 56 exiting through and heating the counter flow heat exchanger 52.

A first condensate pump 68 can deliver the first condensate 66 from the first condenser 56b of the vapor compression distiller 41 to the ammonia removal device 60, through a conduit 70 coupled between the first condenser 56b and the spray, dispensing, nozzle, delivery or manifold assembly 7, of, at or above an aerator or ammonia removal section, structure or portion 72 of the ammonia removal device 60. The ammonia removal device 60 can have a generally elongate round, circular, or cylindrical shape, and can be aligned or positioned along the central axis A within annular cavity 58 between the sump 54 and the counter flow heat exchanger 52. The ammonia removal device 60 can be positioned above the rotor 1, or can be considered to include the rotor 1 or certain components thereof. The evaporator/condenser 56 can generally and annularly surround the ammonia removal device 60. Annularly positioning the evaporator/condenser 56 within a dewar 42, which in turn annularly or concentrically surrounds ammonia removal device 60, can conserve or make use of existing heat from the operation of vapor compression distiller 41 and motor 3 for heating or operating ammonia removal device 60, for example, in some embodiments, at slightly above 212° F.

Referring to FIGS. 1-8, the ammonia removal device 60 can include the nozzle assembly 7, the ammonia removal portion 72 which can be positioned below the nozzle assembly 7, and a second evaporator/condenser 74 which in turn can be positioned below the ammonia removal portion 72. In some embodiments, a second compressor 25 can also be considered included in the ammonia removal device 60, and can be located within the rotor 1. The nozzle assembly 7, ammonia removal portion 72 and second evaporator/condenser 74 can be contained within or connected together by an ammonia removal device housing, container, shell, or mounting structure 60a, into an elongate generally round or cylindrical module, for positioning above rotor 1, and along central axis A.

In use, first condensate 66 from the first condenser 56b containing ammonia (for example 80 ppm) is delivered via conduit 70, to nozzle assembly 7 with nozzles 9 for spraying the first liquid condensate 66 over liquid flow surfaces 13a of ammonia removal portion 72. As described below, the first condensate 66 can be mixed with second condensate 84, but will be currently described as first condensate 66 for simplicity. Second vapor, water vapor or steam 78 rising upwardly through gaps 14 between the liquid flow surfaces 13a in the ammonia removal portion 72, past the first condensate 66 flowing downwardly over the liquid flow surfaces 13a strips, absorbs or removes most of the ammonia (for example 75 ppm) within the first condensate 66, resulting in first liquid condensate with reduced ammonia 46a (5 ppm or less) flowing downwardly from the ammonia removal portion 72. An additive such as sodium hydroxide (NaOH) can be added to the first condensate 66 through a conduit or port 90 connected to the conduit 70 prior to or upstream of ammonia removal portion 72 to reduce the solubility of ammonia in the first condensate 66 by raising the pH. The first liquid condensate with reduced ammonia 46a flows downwardly into a second evaporator 15 of a second evaporator/condenser 74 positioned below the ammonia removal portion 72. One portion of the first condensate with reduce ammonia 46a evaporates on second evaporator surfaces 15a of the second evaporator 15, and produces the second vapor 78 with low ammonia that then rises or moves upwardly through the ammonia removal portion 72, for removing the ammonia from the downwardly flowing first condensate 66. Another portion of the first liquid condensate with reduced ammonia 46a drains out of an exit 80 in the second evaporator 15 for removal or use through counter flow heat exchanger 52 and outlet 46. A second vapor with or containing absorbed ammonia 82 exits the top of the liquid flow surfaces 13a of the ammonia removal portion 72 through port 19 and channel or conduit 21, entering a second compressor 25 through inlet 23. The second compressor 25 can be on or connected to rotor 1 and rotatably driven by the same motor 3 as the first compressor 62 about central axis A. The compressed second vapor with absorbed ammonia 82 exits the second compressor 25 via channels outlets or conduit 27 for delivery to the connected second condenser 31 of the second evaporator/condenser 74, and condensing into a second liquid or water distillate or condensate 84 having ammonia which can exit through drain channel 33. The second condensate 84 having ammonia can be conveyed through a recirculating conduit 86 that can join with conduit 70 for mixing the second condensate 84 with the first condensate 66 for delivery to the ammonia removal portion 72 for reprocessing to remove ammonia. Conduit 86 can connect the second condenser 31 to the conduit 70. Concentrate 48a can be removed from the second condenser 31 through channel, outlet or conduit 35 with a high concentration of ammonia for removal and disposal, out through counter flow heat exchanger 52 and outlet 48. Exhaust gases 58 can also be removed from an outlet of the second condenser 31 through counter flow heat exchanger 52 and outlet 50.

The nozzle assembly 7 (FIGS. 3, 4 and 6) can include a series of nozzles 9 arranged in a generally evenly spaced pattern in a circular or annular manner about central axis A. Each nozzle 9 can include an elongate slot or opening 11 extending radially inward toward central axis A for delivering the first liquid condensate 66 downwardly with gravity to the ammonia removal portion 72. The length of the slots 11 can vary in alternating fashion to compensate for inwardly radial extension of the slots into a decreasing area, for example, alternating long slots 11 which are separated by short slots 11. This can provide a generally even annular or angular distribution of the first condensate 66 over an annular region of the ammonia removal portion 72. The slots 11 can provide a laterally spreading spray.

The aerator or ammonia removal portion 72 (FIGS. 2-4, 7 and 7A) can be positioned adjacent to or below the nozzle assembly 7, and can include a generally annular liquid flow or aerator structure or member 13 having large surface area liquid flow surfaces 13a, which can be formed of generally upright downwardly extending spaced apart curved thin sheets of material forming upright walls 92 of decreasing radius positioned about central axis A, with upright gaps 14 therebetween. In one embodiment, the liquid flow surfaces 13a can be formed of an upright spiral structure or configuration of thin sheet material closely wrapped or wound in high density annular spiral, separated or spaced apart by upright spiral gaps, cavities or spaces 14. In some embodiments, the liquid flow surfaces 13a can include between about 40 to 50 spiral revolutions, and can have about 50 turns or revolutions. Gaps 14 can be about 20 mils (0.02 inches) in size. This can allow the liquid flow surfaces 13a with a large surface area and high density to receive the first condensate 66 from the nozzle assembly 7 and provide a series of spaced apart generally curved thin upright films 76 of downwardly flowing first liquid condensate 66 of decreasing radius flowing downwardly with gravity, on both or opposite sides of the walls 92 of thin sheet material, in twin, double or duplicate fashion, such as in a tall upright spiral configuration, separated by the walls 92 and spiral gaps 14 (also of large surface area). The liquid flow surfaces 13a can be formed of a thin textured sheet material, such as metals, which can be copper, aluminum, steel etc., or alloys thereof, or can be plastic, such as hydrophilic plastic, or other suitable materials, such as nonwoven materials. The thickness of the films 76 of flowing liquid can be about 1 to 1.25 mils thick (0.001-0.00125 inches). As the flowing films 76 of the first liquid condensate 66 flows downwardly on the liquid flow surfaces 13a, a second vapor, water vapor or steam 78 having little or no, or lower ammonia content can rise or flow upwardly through the curved or spiral gaps 14 in a counterflow direction on, across or over the films 76 of the first condensate 66, within the aerator structure 13. The upwardly moving second vapor 78 can absorb, remove or strip ammonia from the downwardly flowing film 76 of the first condensate 66 until the gas phase equilibrium is satisfied in relation to the solubility in liquid phase, which can be sufficient to lower the concentration of ammonia in the first condensate 66 to about or less than 5 ppm, resulting in the first liquid condensate with reduced ammonia 46a, exiting the bottom of the aerator structure 13, and second vapor with ammonia 82 exiting the top of the aerator structure 13. The second vapor with ammonia 82 can exit a port 19 at the top of the ammonia removal portion 72 and flow downwardly through a channel, passage or conduit 21 near the center of the ammonia removal portion 72 to exit thereof.

The second evaporator/condenser 74 (FIGS. 2-5 and 8) can be positioned below the ammonia removal portion 72 in alignment along central axis A, and can be separated by a short annular gap 88 therebetween. The second evaporator/condenser 74 can have a round spiral structure, and can have a second evaporator 15 with upright second evaporator surfaces 15a forming upright spiral voids or channels 17 for receiving the first condensate with reduced ammonia 46a flowing downwardly with gravity from the ammonia removal portion 72. The second evaporator/condenser 74 also includes a second condenser 31 having upright second condenser surfaces 31a on opposite sides of common walls with the second evaporator surfaces 15a, forming upright spiral voids or channels 29 which are sealed to be separated from channels 17, for receiving the second vapor with ammonia 82. The second evaporator/condenser 74 can have common channel walls formed by spaced apart generally curved thin sheets of material of decreasing radius positioned about the central axis A. Channels 17 can be sealed at the bottom and channels 29 can be sealed on an opposite end at the top. The second evaporator/condenser 74 can have an elongate circular, cylindrical or annular shape that can align underneath the corresponding shape of the aerator structure 13 with the same or similar footprint for receiving falling first condensate with reduce ammonia 46a in an even spread out manner, and the second evaporator 15 can be open at the top. In some embodiments, the spiral channels 17 and 29 and the walls therebetween, can each have about 12 to 15 turns or revolutions about a central axis A, with decreasing radius. The second evaporator surfaces 15a can evaporate one portion of the first condensate with reduced ammonia 46a for producing the second vapor 78 with low ammonia which can rise upwardly through the gaps 14 in the aerator structure 13 of the ammonia removal portion 72. Another portion of the first liquid condensate with reduced ammonia 46a that does not evaporate can be drained from the channel 17 through at least one or more exits or outlets 80 from channels 17, for removal through counter flow heat exchanger 52 the outlet 46. Since the first condensate with reduced ammonia 46a can have a concentration of ammonia of about 5 ppm or less, such a distillate or water can be used for various desirable purposes.

The second vapor with ammonia 82 leaving the ammonium removal portion 72 through conduit 21 can enter or be drawn into the second compressor 25 for compression through inlet 23, which can be at a radially inward location of the rotor 1. The second compressor 25 can be part of rotor 1 or formed therein, for rotation about central axis A, and can include rotary turbine or fan blades. Compressed second vapor with absorbed ammonia 82 can exit the second compressor 25 at, through or into an outlet or conduit 27 which can be at a radially outward location of the rotor 1, and can be in communication with spiral channels 29 of the second condenser 31 at a radially outward location or end for delivering the compressed second vapor with absorbed ammonia 82 for condensing. The spiral walls of channels 29 of the second condenser 31 can be common with the spiral walls of channel 17 of the second separator 15. This can facilitate heat transfer from the hot compressed second vapor with ammonia 82 on the second condensing surfaces 31a to heat the second evaporator surfaces 15a on the opposite side of the wall for evaporating the first condensate with reduced ammonia 46a in the second evaporator 15 for economical or efficient production of the second vapor 78 for ammonia stripping. As the compressed second vapor with ammonia 82 travels or spirals radially inwardly through spiral channels 29, the ammonia laden second vapor 82 condenses into the second liquid condensate 84 having ammonia, with a concentration of ammonia increasing as the second vapor 82 and second condensate 84 travels further within channels 29. The second condensate 84 with ammonia can be withdrawn from a drain channel 33 before the end of channel 29 for recirculating via recirculating conduit 86 for delivery back to the nozzle assembly 7 for reprocessing and again removing the ammonia in the ammonia removal portion 72. The recirculating conduit 86 can connect to conduit 70 for mixing the second condensate 84 with the first condensate 66 prior to the ammonia removal portion 72. The radially inner end of channel 29 can have an exit channel 35 in which concentrate liquid or water condensate or distillate 48a with high concentrations of ammonia can exit the second condenser 31 for removal through counter flow heat exchanger 52 and outlet 48 for use of its ammonia or for disposal. Noncondensing gases 50a remaining at the radially inward end of channel 29 can also be vented for removal through counterflow heat exchanger 52 and outlet 50.

Positioning the ammonia removal device 60 within the same dewar 42 with vapor compression distiller 41 can allow ammonia stripping or removal to take place in an efficient low energy, cost effective manner. Components such as the second compressor 25 and any needed pumps can be run off a common rotor 1, and can make use of existing heat from the vapor compression distiller 41 which can surround the ammonia removal device 60. Flowing the first liquid condensate 66 downwardly with gravity over the aerator structure 13 and into the second evaporator/condenser 74 can also contribute to the efficiency.

Although the aerator structure 13 and second evaporator/condenser 74 have been described to have annular spiral structures, other structural configurations are contemplated for example, concentric, annular cylindrical structures, or a series of flat spaced apart upright surfaces. The dewar 42, vapor compression distiller 41, ammonia removal device 60, ammonia removal portion 72 and second evaporator/condenser 74 do not have to be round or cylindrical, and can be rectangular or polygonal in shape. The ammonia removal device 60 does not have to be within the vapor compression distiller 41 or dewar 42, and can be a separate unit, or can be an add-on to an existing system or distiller, including other types of distillers or systems. The present invention can be used for distilling liquids other than water, but is suitable for processing wastewater with ammonia since water containing 80 ppm of ammonia can produce condensate having 5 ppm of ammonia or less. In some embodiments, the ammonia removal portion 72 does not have to be aligned above the second evaporator/condenser 74, and the flow of vapor, liquid and/or condensate between the ammonia removal portion 72 and the second evaporator/condenser 74 can be provided by pumps, turbines or pressure diferentials. The ammonia removal portion 72 and the second evaporator/condenser can be side by side or spaced apart from each other.

While this invention has been particularly shown and described with references to example embodiments thereof, it will be understood by those skilled in the art that various changes in form and details may be made therein without departing from the scope of the invention encompassed by the appended claims.

What is claimed is:

1. An ammonia removal system for removing ammonia from liquid comprising;
   an ammonia removal portion having liquid flow surfaces for flowing the liquid over the liquid flow surfaces downward with gravity, and for receiving vapor moving upwardly past and over the downward flowing liquid for absorbing and removing ammonia from the liquid, in which the liquid flow surfaces of the ammonia removal portion comprise a high density arrangement of generally equidistantly spaced apart large area upright surfaces formed of laterally extending upright thin sheet material configured for receiving and positioning downward flow of the liquid over both sides of the thin sheet material forming a high density arrangement of double thin films while the vapor moves upwardly past and over the thin films in gaps therebetween;
   an evaporator positioned below the ammonia removal portion for receiving the downward flowing liquid with reduced ammonia from the ammonia removal portion, one portion of the liquid with reduced ammonia for evaporating and producing the vapor for moving upwardly into the ammonia removal portion for removing the ammonia, and another portion of the liquid with reduced ammonia for being drained for removal;
   a compressor in communication with the ammonia removal portion for compressing the vapor after exiting the ammonia removal portion; and
   a condenser in communication with the compressor for receiving compressed vapor from the compressor for condensing into liquid condensate, a recirculating conduit connecting the condenser to the ammonia removal portion for recirculating at least a portion of the liquid condensate to the ammonia removal portion for reprocessing and flowing over the liquid flow surfaces.

2. The system of claim 1 further comprising an outlet from the condenser for removing ammonia.

3. The system of claim 1 in which the ammonia removal portion has spiral liquid flow surfaces which comprise spaced apart upright spiral surfaces formed of the upright thin sheet material being in a dense spiral configured for receiving and positioning downward flow of the liquid over both sides of the thin sheet material forming a double spiral thin films while the vapor moves upwardly past and over the thin films in spiral gaps therebetween.

4. The system of claim 1 in which the evaporator and the condenser are part of an evaporator/condenser having upright evaporator surfaces and channels, and upright condenser surfaces and channels, with common channel walls therebetween.

5. The system of claim 1 in which the spaced apart upright surfaces of the ammonia removal portion are configured for providing a thin film of flowing liquid about 1 to 1.25 mils thick.

6. The system of claim 1 in which the liquid includes distillate water containing ammonia received from a wastewater distiller.

7. The system of claim 1 in which the liquid is delivered to the ammonia removal portion by nozzles positioned above the liquid flow surfaces.

8. The system of claim 4 in which the liquid flow surfaces of the ammonia removal portion comprise spaced apart generally curved thin sheets of material of decreasing radius which are positioned about a central axis above the evaporator/condenser having the common channel walls which comprise spaced apart generally curved thin sheets of material of decreasing radius also positioned about the central axis.

9. The system of claim 8 in which the liquid flow surfaces of the ammonia removal portion are configured for providing a series of spaced apart generally curved thin films of downward flowing liquid of decreasing radius, with the vapor moving in the opposite direction in gaps therebetween.

10. The system of claim 9 in which the liquid flow surfaces of the ammonia removal portion are configured for providing the series of spaced apart generally curved thin films of the downwardly flowing liquid which extend in a spiral configuration.

11. The system of claim 6 in which the evaporator and condenser are positioned within the interior of a vapor compression distiller contained in a housing.

12. A vapor compression distiller for distilling liquid comprising:
a generally cylindrical housing;
a generally annular first evaporator/condenser positioned within the housing having a first evaporator with first evaporator surfaces for evaporating the liquid into a first vapor, and a first condenser with first condenser surfaces for condensing the first vapor into first liquid condensate;
a first compressor for compressing the first vapor produced by the first evaporator surfaces of the first evaporator/condenser for delivery to the first condenser surfaces of the first evaporator/condenser; and
an ammonia removal system positioned within the housing, at least a portion of which being surrounded by the generally annular first evaporator/condenser, the ammonia removal system comprising:
an ammonia removal portion having liquid flow surfaces for flowing the first liquid condensate over the liquid flow surfaces downward with gravity, and for receiving a second vapor moving upwardly past and over the downward flowing first liquid condensate for absorbing and removing ammonia therefrom;
a second evaporator/condenser having a second evaporator with second evaporator surfaces positioned below the ammonia removal portion for receiving the downward flowing first liquid condensate with reduced ammonia from the ammonia removal portion, one portion of the first liquid condensate with reduced ammonia for evaporating and producing the second vapor for moving upwardly into the ammonia removal portion for removing the ammonia, and another portion of the first liquid condensate with reduced ammonia for being drained for removal, the second evaporator/condenser also having a second condenser with second condenser surfaces;
a second compressor in communication with the ammonia removal portion and the second condenser for compressing the second vapor after exiting the ammonia removal portion, the second condenser for receiving compressed second vapor from the second compressor for condensing into a second liquid condensate; and
a recirculating conduit connecting the second condenser to the ammonia removal portion for recirculating at least a portion of the second liquid condensate back to the ammonia removal portion for reprocessing together with the first liquid condensate for flowing over the liquid flow surfaces.

13. A vapor compression distiller for distilling liquid comprising:
a housing;
a first evaporator/condenser positioned within the housing having a first evaporator with first evaporator surfaces for evaporating the liquid into a first vapor, and a first condenser with first condenser surfaces for condensing the first vapor into first liquid condensate;
a first compressor for compressing the first vapor produced by the first evaporator surfaces of the first evaporator/condenser for delivery to the first condenser surfaces of the first evaporator/condenser; and
an ammonia removal system positioned within the housing, the ammonia removal system comprising:
an ammonia removal portion having liquid flow surfaces for flowing the first liquid condensate over the liquid flow surfaces downward with gravity, and for receiving a second vapor moving upwardly past and over the downward flowing first liquid condensate for absorbing and removing ammonia therefrom;
a second evaporator/condenser having a second evaporator with second evaporator surfaces positioned below the ammonia removal portion for receiving the downward flowing first liquid condensate with reduced ammonia from the ammonia removal portion, one portion of the first liquid condensate with reduced ammonia for evaporating and producing the second vapor for moving upwardly into the ammonia removal portion for removing the ammonia, and another portion of the first liquid condensate with reduced ammonia for being drained for removal, the second evaporator/condenser also having a second condenser with second condenser surfaces;
a second compressor in communication with the ammonia removal portion and the second condenser for compressing the second vapor after exiting the ammonia removal portion, the second condenser for receiving compressed second vapor from the second compressor for condensing into a second liquid condensate; and
a recirculating conduit connecting the second condenser to the ammonia removal portion for recirculating at least a portion of the second liquid condensate back to the ammonia removal portion for reprocessing together with the first liquid condensate for flowing over the liquid flow surfaces.

14. The distiller of claim 13 in which at least a portion of the ammonia removal system is surround by the first evaporator/condenser.

* * * * *